(12) United States Patent
Rode

(10) Patent No.: US 7,134,648 B1
(45) Date of Patent: Nov. 14, 2006

(54) INTERLOCKING DISC SPRING ASSEMBLIES AND ADJUSTABLE INTERLOCKING DISC SPRING ASSEMBLIES

(76) Inventor: John E. Rode, Perssee Rd., P.O. Box 1127, Fonda, NY (US) 12068

( * ) Notice: Subject to any disclaimer, the term of this patent is extended or adjusted under 35 U.S.C. 154(b) by 437 days.

(21) Appl. No.: 10/133,602

(22) Filed: Apr. 26, 2002

Related U.S. Application Data

(63) Continuation-in-part of application No. 10/054,253, filed on Jan. 22, 2002.

(51) Int. Cl.
*F16F 1/34* (2006.01)

(52) U.S. Cl. .................................... 267/162

(58) Field of Classification Search ................ 267/162, 267/159; 188/159, 162
See application file for complete search history.

(56) References Cited

U.S. PATENT DOCUMENTS

| | | | |
|---|---|---|---|
| 82,276 A | 9/1868 | Bellerville | |
| 1,819,281 A | 8/1931 | Dexter | |
| 1,826,597 A * | 10/1931 | Brecht | 267/162 |
| 1,901,898 A | 3/1933 | Clarke | |
| 2,162,719 A * | 6/1939 | Hay | 267/162 |
| 2,323,985 A * | 7/1943 | Fausek et al. | 267/162 |
| 2,432,717 A | 12/1947 | Berger | 267/162 |
| 2,886,380 A | 5/1959 | Lambeek | 308/72 |
| 3,029,071 A | 4/1962 | Wells | 267/161 |
| 3,098,643 A | 7/1963 | Ondrejka | 267/165 |
| 3,107,905 A | 10/1963 | Lucas | 267/161 |
| 3,224,344 A | 12/1965 | Baumann et al. | |
| 3,313,552 A | 4/1967 | McElya et al. | 277/95 |
| 3,394,631 A | 7/1968 | Thompson | |
| 3,836,195 A | 9/1974 | Teeri | 267/162 |
| 4,067,585 A | 1/1978 | Rode | 277/200 |
| 4,745,846 A * | 5/1988 | Eickmann | 91/488 |
| 4,799,654 A * | 1/1989 | Eickmann | 267/162 |
| 5,065,988 A | 11/1991 | Wedell | 267/149 |
| 5,072,917 A | 12/1991 | Pleva | 267/162 |
| 5,112,178 A | 5/1992 | Overhues et al. | 411/544 |

(Continued)

FOREIGN PATENT DOCUMENTS

DE 2323642 A * 11/1974

(Continued)

*Primary Examiner*—Thomas Williams
(74) *Attorney, Agent, or Firm*—Heslin Rothenberg Farley & Mesiti PC; Nicholas Mesiti, Esq.; Victor A. Cardona, Esq.

(57) ABSTRACT

An interlocking disc spring assembly includes a plurality of alternating interlocking first conically-shaped disc springs and second conically-shaped disc springs. The first disc spring includes a first radial inner portion and a first radial outer portion. The first radial inner portion defines a first opening therethrough and includes an upwardly-extending portion spaced from the first opening. The first radial outer portion includes a downwardly-depending portion. The second disc spring has a second radial inner portion and a second radial outer portion. The second radial inner portion defines a second opening therethrough and includes a downwardly-depending portion. The second radial outer portion of the second disc spring is receivable within the downwardly-depending portion of the first radial outer portion of the first disc spring when the first disc spring is stacked on the second disc spring. The downwardly-depending portion of the second radial inner portion of the second disc spring is receivable within the upwardly-extending portion of the first radial inner portion of the first disc spring when the second disc spring is stacked on the first disc spring. In another embodiment, an adjustable spacer may connect the inner portions of adjacent interlocking disc springs.

9 Claims, 6 Drawing Sheets

U.S. PATENT DOCUMENTS

| | | | |
|---|---|---|---|
| 5,222,718 A | 6/1993 | Buck | 267/162 |
| 5,253,852 A | 10/1993 | Pleva | 267/162 |
| 5,336,320 A | 8/1994 | Hogan et al. | 118/300 |

FOREIGN PATENT DOCUMENTS

| | | | |
|---|---|---|---|
| DE | 3635156 A1 * | 4/1987 | |
| DE | 3633053 A1 * | 4/1988 | |
| JP | 52-022648 A * | 2/1977 | 267/162 |
| JP | 10-054432 * | 2/1998 | |

* cited by examiner

INTERLOCKING DISC SPRING ASSEMBLIES AND ADJUSTABLE INTERLOCKING DISC SPRING ASSEMBLIES

RELATED APPLICATION

This application is a continuation-in-part of U.S. patent application Ser. No. 10/054,253, filed Jan. 22, 2002, entitled "Adjustable Disc Spring Systems and Methods." The entire subject of this application is incorporated herein by reference.

FIELD OF THE INVENTION

The present invention relates generally to resilient members, and more particularly to disc springs and adjustable disc spring assemblies.

BACKGROUND OF THE INVENTION

Disc springs, sometimes referred to as Belleville washers, are conical shaped washers which are designed to be loaded in an axial direction. Under high loads disc springs produce small deflections, as compared with other types of springs such as helical or coil springs.

Variable spring characteristics can be achieved by stacking a plurality of disc springs. A problem with stacking a plurality of disc springs is the need to maintain the plurality of disc springs in the stack when a force is applied axially on the stack.

There is a need for further disc spring configurations and adjustable disc spring assembly configurations.

SUMMARY OF THE INVENTION

The present invention provides, in a first aspect, an interlocking disc spring assembly which includes a first conically-shaped disc spring and a second conically-shaped disc spring. The first disc spring has a first radial inner portion and a first radial outer portion. The first radial inner portion defines a first opening and has an upwardly-extending portion spaced from the first opening. The first radial outer portion has a downwardly-depending portion. The second disc spring has a second radial inner portion and a second radial outer portion. The second radial inner portion defines a second opening and has a downwardly-depending portion. The second radial outer portion of the second disc spring is receivable within the downwardly-depending portion of the first radial outer portion of the first disc spring when the first disc spring is stacked on the second disc spring. The downwardly-depending portion of the second radial inner portion of the second disc spring is receivable within the upwardly-extending portion of the radial inner portion of the first disc spring when the second disc spring is stacked on the first disc spring.

The present invention provides, in a second aspect, an adjustable interlocking disc spring assembly which includes a first subassembly and a second subassembly. The first subassembly includes a first adjustable spacer disposed between a first lower conically-shaped disc spring and a first upper conically-shaped disc spring. The first lower disc spring has a first lower radial outer portion having a downwardly-depending portion. The second subassembly includes a second adjustable spacer disposed between a second lower conically-shaped disc spring and a second upper conically-shaped disc spring. The second upper disc spring has a second upper radial outer portion which is receivable within the downwardly-depending portion of the first lower radial outer portion of the first lower disc spring when the first subassembly is stacked on the second subassembly.

The present invention provides, in a third aspect, an interlocking disc spring assembly which includes a first conically-shaped disc spring and a second conically-shaped disc spring. The first disc spring has a first radial inner portion and a first radial outer portion. The first radial inner portion defines a first opening and has an upwardly-extending portion. The first radial outer portion has a downwardly-depending portion. The second conically-shaped disc spring has a second radial inner portion and a second radial outer portion. The second radial outer portion is receivable within the downwardly-depending portion of the first radial outer portion of the first disc spring when the first disc spring is stacked on the second disc spring. The second radial inner portion of the second disc spring is receivable within the upwardly-extending portion of the first radial inner portion of the first disc spring when the second disc spring is stacked on the first disc spring.

The present invention provides, in a fourth aspect, an interlocking disc spring assembly which includes a first conically-shaped disc spring and a second conically-shaped disc spring. The first disc spring has a first radial inner portion and a first radial outer portion. The first radial inner portion defines a first opening and has a downwardly-depending portion. The second disc spring has a second radial inner portion and a second radial outer portion with the second radial outer portion having a downwardly-depending portion. The second radial inner portion of the second disc spring is receivable within the downwardly-depending portion of the first radial inner portion of the first disc spring when the first disc spring is stacked on the second disc spring. The first radial outer portion of the first disc spring is receivable within the downwardly-depending portion of the second radial outer portion of the second disc spring when the second disc spring is stacked on the first disc spring.

The present invention provides, in a fifth aspect, an interlocking disc spring assembly which includes a first conically-shaped disc spring and a second conically-shaped disc spring. The first disc spring has a first radial inner portion and a first radial outer portion. The first radial inner portion defines a first opening and has an upwardly-curved portion. The second disc spring has a second radial inner portion and a second radial outer portion with the second radial outer portion having an upwardly-curved portion. The second radial inner portion of the second disc spring has a curved end for engaging the first radial inner portion of the first disc spring when the second disc spring is stacked on the first disc spring. The first radial outer portion of the first disc spring has a curved end for engaging the second radial outer portion of the second disc spring when the first disc spring is stacked on the second disc spring.

BRIEF DESCRIPTION OF THE DRAWINGS

The subject matter which is regarded as the invention is particularly pointed out and distinctly claimed in the concluding portion of the specification. The invention, however, may be understood by reference to the following detailed description of the following embodiments and the accompanying drawings in which:

DETAILED DESCRIPTION OF THE INVENTION

The interlocking disc spring assemblies and adjustable interlocking disc spring assemblies of the present invention include a plurality of interlocking disc springs in which adjacent disc springs fit together and are held together in axial alignment. The interlocking disc spring assemblies and adjustable interlocking disc spring assemblies generally comprise a ring-shaped configuration and include an outer peripheral edge, which may be positioned within a cylindrically-shaped cavity or tube (not shown), and an inner edge, which may be positioned about a shaft or aligning rod (not shown). In addition, the interlocking features of the disc springs allow the assemblies to be used without any confining cylinder or shaft in order to hold the disc springs in alignment, particularly under an axial load applied to the assemblies.

Figure 1:
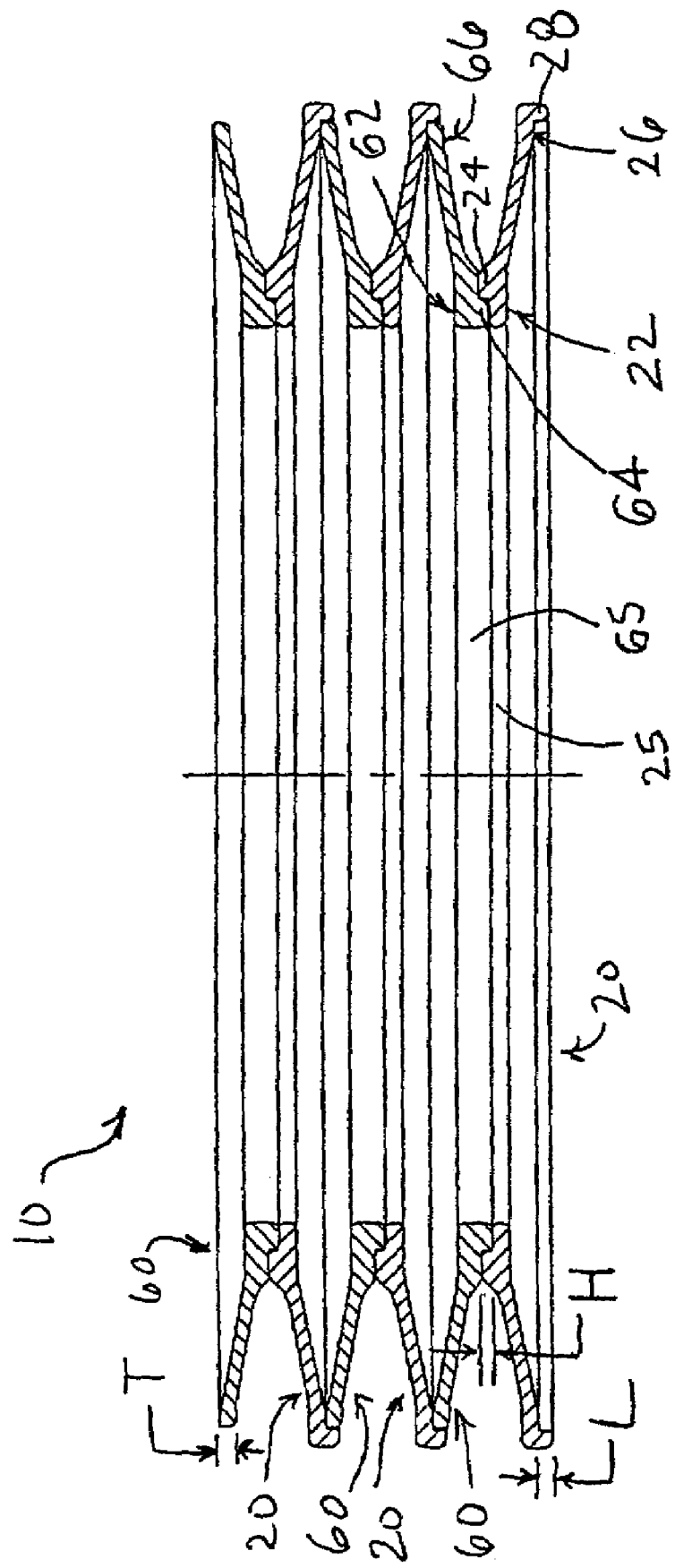
FIG. 1 is a cross-sectional view of a plurality of interlocking disc springs in accordance with the present invention.

FIG. 1 illustrates an interlocking disc spring assembly 10, in accordance with the present invention, having a plurality of interlocking disc springs. In this exemplary embodiment, interlocking disc spring assembly 10 generally includes a plurality of alternating interlocking first conically-shaped disc springs 20 and second conically-shaped disc springs 60.

First disc spring 20 may include a first radial inner portion 22 and a first radial outer portion 26. First radial inner portion 22 defines a first central opening therethrough and includes an upwardly-extending portion 24 spaced from the first opening. First radial outer portion 26 includes a downwardly-depending portion 28. "Upwardly" and "downwardly" are used herein to refer to directions when the disc springs described herein are stacked atop one another. Specifically, "upwardly" refers to a direction generally toward a first end of the stack of disc springs and "downwardly" refers to a direction generally toward a second end of the stack.

Second disc spring 60 has a second radial inner portion 62 and a second radial outer portion 66. Second radial inner portion 62 defines a second central opening therethrough and includes a downwardly-depending portion 64.

As shown in FIG. 1, second radial outer portion 66 of second disc spring 60 is receivable within downwardly-depending portion 28 of first radial outer portion 26 of first disc spring 20 when first disc spring 20 is stacked on second disc spring 60. In addition, downwardly-depending portion 64 of second radial inner portion 62 of second disc spring 60 is receivable within upwardly-extending portion 24 of radial inner portion 22 of first disc spring 20 when second disc spring 60 is stacked on first disc spring 20.

From the present description, it will be appreciated that a pair of first and second disc springs may be suitably used and stacked, for example, with their radial inner portions engaging or with their radial outer portions engaging. In addition, a plurality of first and second disc springs may be suitably stacked as illustrated in FIG. 1. It will also be appreciated that the radial outer portions of the uppermost and lowermost disc springs of a stack of disc springs need not be interlockable.

As illustrated in FIG. 1, first radial inner portion 22 of first disc spring 20 includes a first surface 25 defining the first opening, and second radial inner portion 62 of second disc spring 60 includes a second surface defining the second opening. When first disc spring 20 is stacked on second disc spring 60 and/or second disc spring 60 is stacked on first disc spring 20, first surface 25 may be aligned with second surface 65. It will also be appreciated, however, that the first opening and the second opening may comprise different configurations or sizes and need not be alignable.

Downwardly-depending portion 28 of first radial outer portion 26 of first disc spring 20 may extend downwardly a length L, and second radial outer portion 66 of second disc spring 60 may comprises a thickness T. As illustrated in FIG. 1, length L may be generally equal to thickness T. It will be appreciated that other lengths and thicknesses may be suitably employed to allow the first and second disc springs to interlock together when stacked. In addition, the radial outer portion 66 of second disc spring 60 may have a outer horizontally-extending or straight portion which sits flat onto radial outer portion 26 of disc spring 20.

Upwardly-extending portion 24 of first radial inner portion 22 of first disc spring 20 may have a first height H, downwardly-depending portion 64 of second radial inner portion 62 of second disc spring 60 may have a second height H, and the first height may be generally equal to the second height.

As shown in FIG. 1, upwardly-extending portion 24 of first radial inner portion 22 of first disc spring 20 extends continuously along first radial inner portion 22, downwardly-depending portion 64 of second radial inner portion 62 of second disc spring 60 extends continuously along second radial inner portion 62, and downwardly-depending portion 28 of first radial outer portion 26 of first disc spring 20 extends continuously along first radial outer portion 26. Other suitable configurations of the interlocking portions may include portions which do not extend continuously along the inner or radial outer portions. For example, the upwardly-extending and downwardly-depending portions may include spaced-apart projections disposed along the inner and/or radial outer portions of the disc springs.

Figure 2:
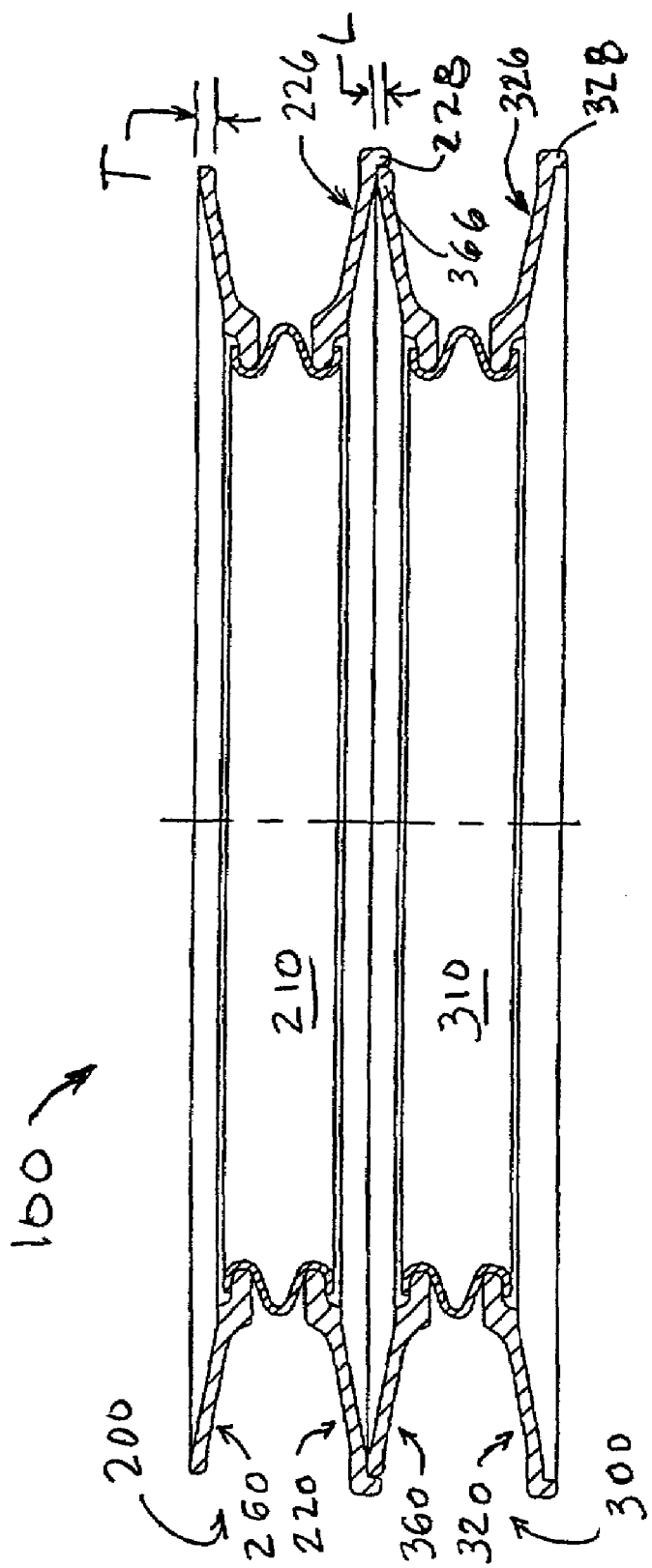
FIG. 2 is a cross-sectional view of a pair of adjustable interlocking disc spring assemblies, in accordance with the present invention, with each assembly having pair of interlocking disc springs and an adjustable spacer.

FIG. 2 illustrates an adjustable interlocking disc spring assembly 100, in accordance with the present invention, having a first subassembly 200 and a second subassembly 300.

First subassembly 200 includes a first adjustable spacer 210 disposed between a first lower conically-shaped disc spring 220 and a first upper conically-shaped disc spring 260. First lower disc spring 220 has a first lower radial outer portion 226 having a downwardly-depending portion 228. Second subassembly 300 includes a second adjustable spacer 310 disposed between a second lower conically-shaped disc spring 320 and a second upper conically-shaped disc spring 360. Second upper disc spring 360 has a second upper radial outer portion 366.

In the embodiment shown in FIG. 2, the adjustable spacers include a compressible central portion which may result in the assembly having a greater deflection under an axial load compared with the embodiment shown in FIG. 1 under the axial load. Adjustable spacers of the type usable in the present invention are disclosed in U.S. Pat. No. 4,067,585 to Rode, the entire subject matter of which is incorporated herein by reference. It will be appreciated that other adjustable spacers and the means for attaching the disc springs to the adjustable spacer may also be employed in accordance with the present invention.

Second upper radial outer portion 366 of second upper disc spring 360 is receivable within downwardly-depending portion 228 of first lower radial outer portion 226 of first lower disc spring 320 when first subassembly 200 is stacked on second subassembly 300.

As illustrated in FIG. 2, a second lower radial outer portion 326 of second disc spring 320 may include a downwardly-depending portion 328. The first upper disc spring 260 of first subassembly 200 may be receivable within downwardly-depending portion 328 of second lower radial outer portion 326 of second lower disc spring 320 when second subassembly 300 is stacked on first subassembly 200. It will also be appreciated that the radial outer portions of the uppermost and lowermost disc springs of a stack of subassemblies need not be interlockable.

In addition, the disc springs may include radial inner portions which have offset portions defining the openings therein and engageable with the adjustable spacer. The first and second adjustable spacers may also have a generally curved W-shaped cross-section. Other configurations of the adjustable spacer are possible and may include an adjustable spacer having multiple curved portions.

As illustrated in FIG. 2, the radial inner portions of the disc springs may includes surfaces defining the openings, and when the first subassembly and the second subassembly are stacked the surfaces may be aligned. It will also be appreciated, however, that the first opening and the second opening may comprise different configurations or sizes and need not be alignable.

Downwardly-depending portion 228 of first lower radial outer portion 226 of first lower disc spring 220 may extend downwardly a length L, and second upper radial outer portion 366 of second upper disc spring 360 may comprise a thickness T. As illustrated in FIG. 2, length L may be generally equal to thickness T. It will be appreciated that other lengths and thicknesses may be suitably employed to allow the first and second disc springs to interlock together which stacked. Downwardly-depending portion 228 of first lower radial outer portion 226 of first lower disc spring 220 extends continuously along radial outer portion 226. Other suitable configurations of downwardly-depending portion 228 may include portions which do not extend continuously along the radial outer portion. For example, the downwardly-depending portions may include spaced-apart projections disposed along the radial inner portion of the disc springs.

Figure 3:
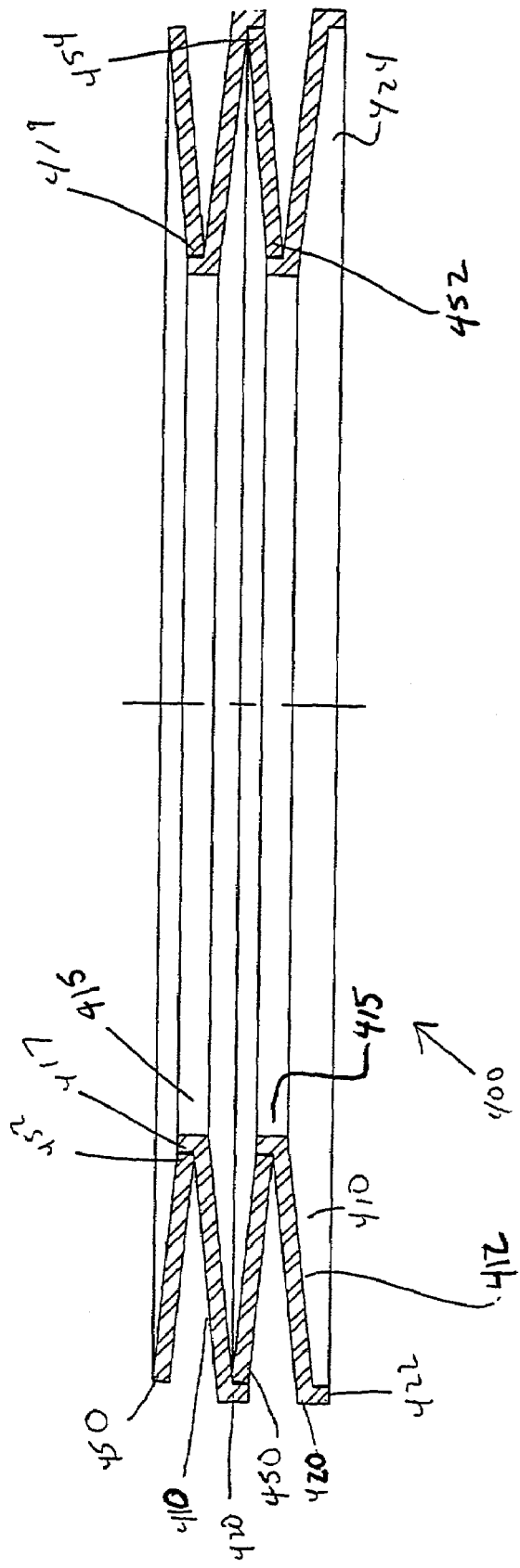
FIG. 3 is a cross-sectional view of another embodiment of a plurality of interlocking disc springs in accordance with the present invention.

In another embodiment of the present invention, an interlocking disc spring assembly 400 includes a plurality of interlocking disc springs as illustrated in FIG. 3. Disc spring assembly 400 includes a plurality of alternating interlocking first conically-shaped disc springs 410 and second conically-shaped disc springs 450.

First disc spring 410 may include a first radial inner portion 415 and a first radial outer portion 420. First radial inner portion 415 may include an upwardly-extending portion 417 and first radial outer portion 420 may include a downwardly-depending portion 422. First radial inner portion 415 may also include a ledge or lip 419 along an outside edge of upwardly-extending portion 417 for engaging second disc spring 450. First radial outer portion 420 may include a ledge or lip 424 along an interior edge of downwardly-depending portion 419 for engaging second disc spring 420. Upwardly-extending portion 417 and/or downwardly-depending portion 422 may be oblique to a central portion 412 of first disc spring 410. First radial inner portion 415 may also define a central opening through disc spring assembly 400.

Second disc spring 420 may be formed in the shape of a standard disc spring, as will be known by those skilled in the art. For example, second disc spring 420 is conically shaped without depending or upwardly-extending portions. Thus, an inner portion 452 of second disc spring 450 may be receivable by upwardly-extending portion 417 of first disc spring 410. Specifically, inner portion 452 may be receivable along lip 419 of first radial inner portion 415. In a similar manner, a radial outer portion 454 of second disc spring 450 may be received by downwardly-depending portion 422 of first disc spring 420. Further, radial outer portion 454 of second disc spring 450 may be received along lip 424 of first disc spring 420.

Also, upwardly-extending portion 417 may run continuously along the circumference of first radial inner portion 415. Further, downwardly-depending portion 422 may run continuously along the circumference of radial outer portion 420. Moreover, central portion 412 and/or second disc spring 450 may be of a uniform thickness along their lengths and/or relative to one another.

Other suitable configurations of interlocking portions may include portions which do not extend continuously along the inner or radial outer portions. For example, the upwardly-extending and downwardly-depending portions may include spaced-apart projections disposed along the inner and/or radial outer portions of the disc springs.

Figure 4:
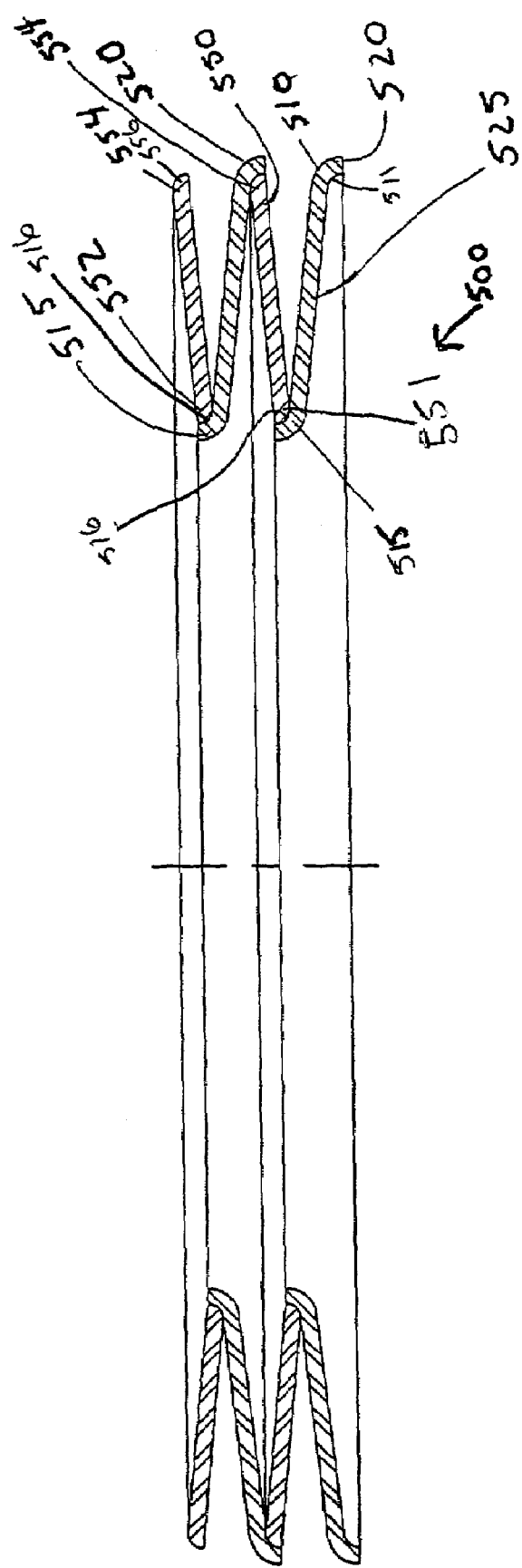
FIG. 4 is a cross-sectional view of a further embodiment of a plurality of interlocking disc springs in accordance with the present invention.

In another embodiment of the present invention, an interlocking disc spring assembly 500 includes a plurality of interlocking disc springs, as depicted in FIG. 4. Disc spring assembly 500 may include a first disc spring 510 and a second disc spring 550 stacked atop one another. First disc spring 510 may include an radial inner portion 515 and a radial outer portion 520. As is evident from FIG. 4, first portion 515 may curve upwardly from a central portion 525 of first disc spring 510. Also, radial outer portion 520 may curve downwardly from central portion 525.

Radial inner portion 515 and radial outer portion 520 may be curved to allow first disc spring to matingly engage or interface second disc spring 550. Specifically, first radial inner portion 515 is curved such that an inner radial face thereof may interface or engage a second radial inner portion 552 of second disc spring 550. For example, an inner-radial face 516 of first radial inner portion 515 and an end 551 of second radial inner portion 552 may have complimentary shapes such that they fit together or interlock with one another. Also, end 551 may be dimensioned such that it does not protrude above a top radial extent of inner radial face 516. Further, a second radial outer portion 520 of first disc spring 510 may be curved such that an inner radial face thereof engages or interfaces first radial outer portion 554 of second disc spring 550. For example, an inner radial face 511 of radial outer portion 520 and an end 556 of radial outer portion 554 may have complimentary shapes such that they fit together or interlock with one another. Also, end 556 may be dimensioned such that it does not protrude above a top radial extent of inner radial face 511.

The curved portion of first disc spring 510 and/or second disc spring 550 may be continuous along the inner and/or outer circumferences thereof. Also, it will be understood by those skilled in the art that the curved portions of the disc springs described could alternatively include spaced apart projections configured to engage one another. Further, radial inner portion 515 may define a central opening of interlocking disc spring assembly 500 while radial outer portion 520 may define an outer peripheral extent of disc spring assembly 500.

Figure 5:
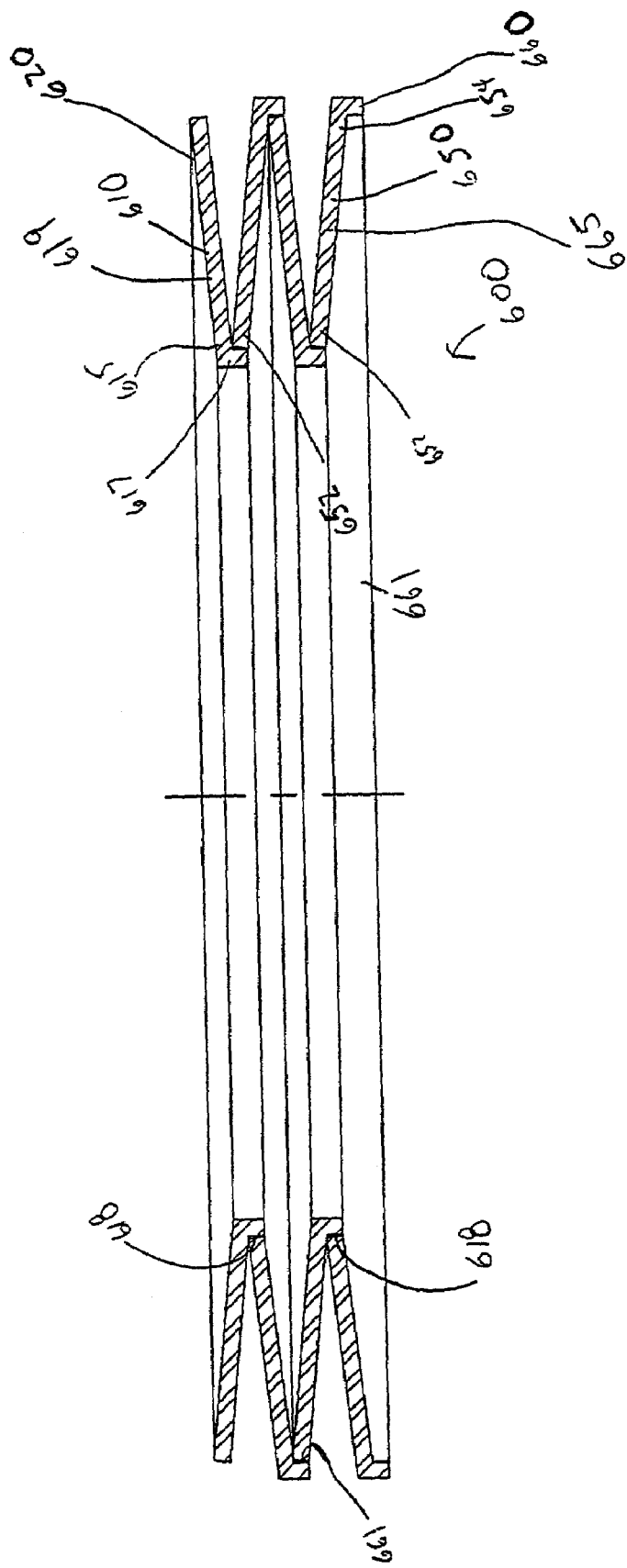
FIG. 5 is a cross-sectional view of yet another embodiment of a plurality of interlocking disc springs in accordance with the present invention.
Figure 6:
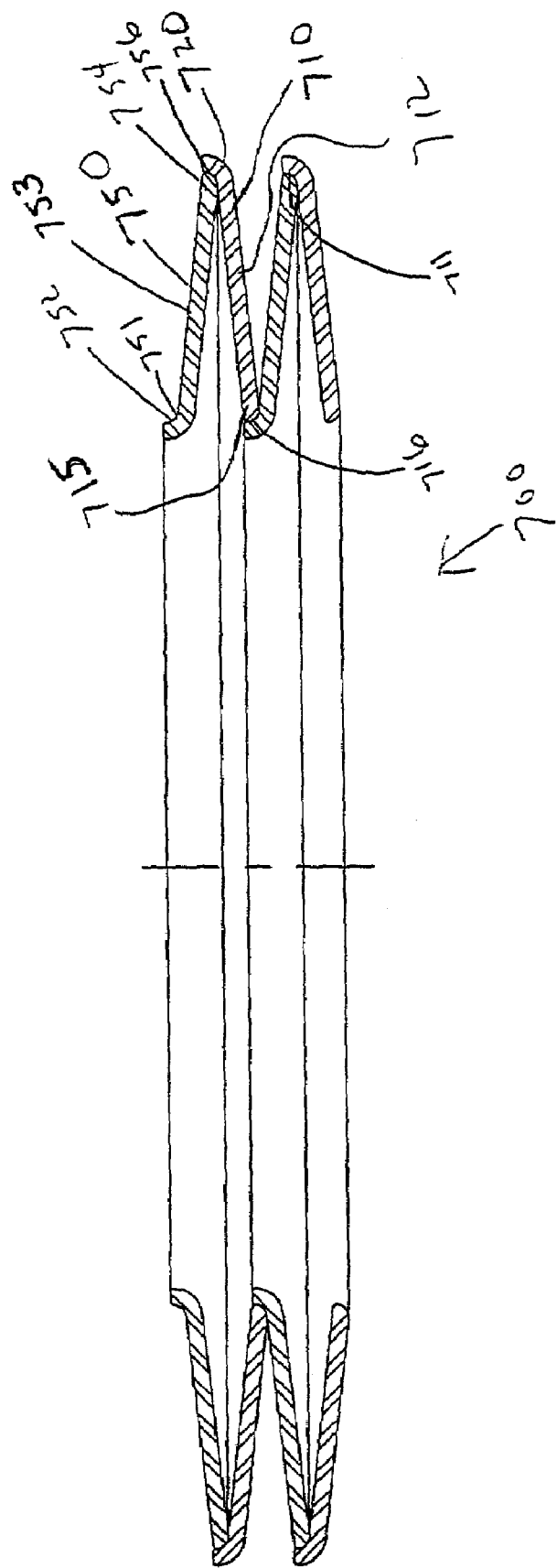
FIG. 6 is cross-sectional view of yet a further embodiment of a plurality of interlocking disc springs in accordance with the present invention.

In another embodiment of the present invention, an interlocking disc spring system 600 includes a plurality of interlocking disc springs, as depicted in FIG. 5. Disc spring assembly 600 includes a plurality of alternating interlocking first conically shaped disc springs 610 and second conically shaped disc springs 650 stacked atop each other.

First disc spring 610 includes a radial inner portion 615 having a downwardly-depending portion 617. A central portion 619 may be oblique to downwardly-depending portion 617. First disc spring 610 also includes a radial outer portion 620.

Second disc spring 650 includes a radial inner portion 652 and a radial outer portion 654. Radial outer portion 654 may also include a downwardly-depending portion 660 which may be oblique to a central portion 665 of second disc spring 650.

Radial inner portion 615 of first disc spring 610 may define a central opening of interlocking disc spring system 600 and radial outer portion 654 of second disc spring 650 may define an outer peripheral extent of interlocking disc spring system 600. Downwardly-depending portion 617 may be configured to receive radial inner portion 652 of second disc spring 650. Specifically, downwardly-depending portion 617 may include a ledge or lip 618 along an outside edge thereof for receiving radial inner portion 652. Further, downwardly-depending portion 617 may project from central portion 619 a distance greater than or equal to a distance radial inner portion 652 protrudes from first disc spring 610, when radial inner portion 652 is received in downwardly-depending portion 617. Likewise, downwardly-depending portion 660 may be configured to receive radial outer portion 620 of first disc spring 610. Particularly, downwardly-depending portion 660 may include a ledge or lip 661 along an interior edge thereof for receiving radial outer portion 620. Further, downwardly-depending portion 660 may project from central portion 665 a distance greater than or equal to a distance radial outer portion 620 protrudes from second disc spring 650, when radial outer portion 620 is received in downwardly-depending portion 660. Moreover, central portion 619 and/or central portion 665 may be of a uniform thickness along their lengths and/or relative to one another.

Further, a height of downwardly-depending portion 617 may be substantially equal to a height of downwardly-depending portion 660. Also, radial inner portion 615 may define a central opening of disc spring system 600 and radial outer portion 654 may define an outer peripheral extent of disc spring system 600. Moreover, downwardly-depending portion 617 may be continuous along radial inner portion 615 and downwardly-depending portion 616 may be continuous along radial outer portion 654. Alternatively, the downwardly-depending portions could include spaced apart projections configured to engage one another.

In another embodiment of the present invention, an interlocking disc spring assembly 700 includes a plurality of interlocking disc springs. In this exemplary embodiment, interlocking disc spring assembly 700 includes a plurality of alternating interlocking first conically shaped disc springs 710 and a plurality of second interlocking disc springs 750.

First disc spring 710 may include a radial inner portion 715 and a radial outer portion 720. Second disc spring 750 may include a radial inner portion 752 and a radial outer portion 754. Radial inner portion 752 may define an opening of disc spring assembly 700 while radial outer portion 720 of first disc spring 710 may define an outer peripheral limit of disc spring assembly 700.

Radial outer portion 720 of first disc spring 710 may be curved upwardly from a central portion 712 of first disc spring 710. Radial outer portion 754 of second disc spring 750 may be curved to interface or matingly engage with radial outer portion 720 of first disc spring 710. Specifically, radial outer portion 720 of first disc spring and radial outer portion 754 of second disc spring may be curved such that an inner radial face 711 of radial outer portion 720 and an end 756 of radial outer portion 754 are configured to fit together, i.e., end 756 of radial outer portion 754 and inner radial face 711 of radial outer portion 720 have complimentary shapes which allow them to interlock. Also, end 756 may be dimensioned such that it does not protrude above a top radial extend of inner radial face 711 when engaged. Likewise, radial inner portion 752 of second disc spring 750 may curve upwardly away from a central portion 753 of second disc spring 750. Radial inner portion 715 of first disc spring 710 may be curved to interface or matingly engage with radial inner portion 752 of second disc spring 750. Particularly, an inner radial face 751 of radial inner portion 752 and an end 716 of radial inner portion 715 may be configured such that their surfaces fit together, match, or are complimentary to one another. Also, end 716 may be dimensioned such that it does not protrude above a top radial extent of inner radial face 751 when engaged. Further, first disc spring 710 and second disc spring 750 may be of a uniform thickness along their lengths and/or relative to one another.

The curved portion of radial outer portion 720 of first disc spring 710 may be continuous along the outer circumference of first disc spring 720 and the curved portion of radial inner portion of 752 of second disc spring 750 may be continuous along the inner circumference thereof. Likewise, radial inner portion 715 of first disc spring 720 and radial outer portion 754 of second disc spring 750 may also be continuous along the inner and outer circumferences, respectively. Alternatively, the curved portions described could be discontinuous. For example, the curved portions may include projections spaced apart from one another configured to engage each other.

The above-described interlocking disc springs may be formed from heat treatable spring steel alloys such as AISI D-2, high temperature alloys such as Inconel 625, or heat treatable precipitation hardening alloys such as Inconel 718, for example. The adjustable spacers may be formed from ductile stainless steel such as 304 stainless steel or Inconel 625, for example. The disc springs described above may be formed by machining. Alternatively, the disc springs described above (e.g., first disc spring 710, second disc spring 750, first disc spring 510 and second disc spring 550) may be formed by stamping, as will be understood by those skilled in the art.

The interlocking disc springs may be pre-coated with a sealant before assembly or may be coated after assembly of the interlocking disc spring assemblies. The coatings may include a soft compliant material such as butyl rubber, Teflon, or a soft metal such as gold or silver.

The above-described interlocking assemblies may be utilized as sealing elements for various static (e.g., non-rotating) applications or dynamic (e.g., rotating) applications which typically require that the sealing elements have significant flexibility. In addition, the uppermost and lowermost disc springs of the assemblies may be formed with a sharpened edge at their radial outer portions so that a seal might be formed by imbedding the sharpened ends of the disc spring into the structure (not shown) to be sealed.

The interlocking disc springs and adjustable spacers in accordance with the present invention may be formed in any shape or size to allow resiliency, adjustability, and compression in any desired direction, when received in any number of restricted spaces, as will be understood by those skilled in the art. For example, it would be evident from the above description to one skilled in the art that the upwardly-extending portions of the disc springs described above could be downwardly-depending and the downwardly-depending portions of the disc springs described above could be upwardly-extending. Also, the adjustable spacers described above may be adapted to receive only one disc spring while the free ends of the adjustable spacer may be adapted to engage a surface or object, as will be understood by those skilled in the art.

While the invention has been described in detail herein in accordance with certain embodiments thereof, many modifications and changes therein may be effected by those skilled in the art. Accordingly, it is intended by the appended claims to cover all such modifications and changes as fall within the true spirit and scope of the invention.

The invention claimed is:

1. An interlocking disc spring assembly comprising:
  a first conically-shaped disc spring having a first radial inner portion and a first radial outer portion, said first radial inner portion having an opening defining portion defining a first opening and said first radial inner portion having an upwardly-extending portion having a radially innermost surface, said radially innermost surface spaced from said first opening, said opening defining portion and said upwardly-extending portion being at different heights relative to each other, and said first radial outer portion having a downwardly-depending portion;
  a second conically-shaped disc spring having a second radial inner portion and a second radial outer portion, said second radial inner portion defining a second opening and having a downwardly-depending portion, said downwardly-depending portion avoiding extending into said first opening; and
  wherein said second radial outer portion of said second disc spring is received on a radially interior side of said downwardly-depending portion of said first radial outer portion of said first disc spring when said first disc spring is stacked on said second disc spring; and
  wherein said downwardly-depending portion of said second radial inner portion of said second disc spring is located between said radially innermost surface and said opening when said second disc spring is stacked on said first disc spring.

2. The interlocking disc spring assembly of claim 1 wherein said upwardly-extending portion of said first radial inner portion of said first disc spring comprises a first height, said downwardly-depending portion of said second radial inner portion of said second disc spring comprises a second height, and wherein said first height is equal to said second height.

3. The interlocking disc spring assembly of claim 1 wherein said downwardly-depending portion of said first radial outer portion of said first disc spring comprises a length, said second radial outer portion of said second disc spring comprises a thickness, and wherein said length is equal to said thickness.

4. The interlocking disc spring assembly of claim 1 wherein said second radial outer portion of said second disc spring comprises an outer horizontally-extending portion.

5. The interlocking disc spring assembly of claim 1 wherein said first disc spring comprises a plurality of said first disc springs, and said second disc spring comprises a plurality of said second conically-shaped disc springs.

6. The interlocking disc spring assembly of claim 1 wherein said first radial inner portion of said first disc spring comprises a first surface defining said first opening, said second radial inner portion of said second disc spring comprises a second surface defining said second opening, and wherein when said first disc spring is stacked on said second disc spring and said second disc spring is stacked on said first disc spring, said first surface is aligned with said second surface.

7. The interlocking disc spring assembly of claim 1 wherein said upwardly-extending portion of said first radial inner portion of said first disc spring extends continuously along said first inner portion, said downwardly-depending portion of said second radial inner portion of said second disc spring extends continuously along said second inner portion, and said downwardly-depending portion of said first radial outer portion of said first disc spring extends continuously along said first radial outer portion.

8. The interlocking disc spring assembly of claim 1 wherein said disc springs comprises a metal.

9. The interlocking disc spring assembly of claim 8 wherein said first disc spring and said second disc spring comprise a coating.

* * * * *